United States Patent
Lin

(10) Patent No.: US 6,868,421 B1
(45) Date of Patent: Mar. 15, 2005

(54) METHOD OF CONVERTING GEOSPATIAL DATABASE INTO COMPRESSIVE DATABASE FOR MULTIPLE DIMENSIONAL DATA STORAGE

(76) Inventor: Ching-Fang Lin, 888 Easy St., Simi Valley, CA (US) 93065

( * ) Notice: Subject to any disclaimer, the term of this patent is extended or adjusted under 35 U.S.C. 154(b) by 607 days.

(21) Appl. No.: 09/724,430

(22) Filed: Nov. 27, 2000

Related U.S. Application Data

(60) Provisional application No. 60/168,183, filed on Nov. 27, 1999.

(51) Int. Cl.⁷ .............................................. G06F 7/00
(52) U.S. Cl. ...................................... 707/101; 707/102
(58) Field of Search ................... 707/1–5, 10, 100–102, 707/104.1, 200, 201; 701/200, 207, 208, 213; 342/350, 352, 357.06, 357.12, 357.13

(56) References Cited

U.S. PATENT DOCUMENTS

| | | | | |
|---|---|---|---|---|
| 4,589,087 A | * | 5/1986 | Auslander et al. | 708/670 |
| 4,907,282 A | * | 3/1990 | Daly et al. | 382/242 |
| 4,972,319 A | * | 11/1990 | Delorme | 340/990 |
| 5,088,050 A | * | 2/1992 | Ito | 345/442 |
| 6,239,810 B1 | * | 5/2001 | Van Hook et al. | 345/420 |
| 6,314,363 B1 | * | 11/2001 | Pilley et al. | 701/120 |
| 6,424,989 B1 | * | 7/2002 | Shaw et al. | 709/201 |

OTHER PUBLICATIONS

Gary Hacker and Paul Kruegar, "Report on future Mapping, Charting, and Geodesy Dital Information and Services Available from the Defense Mapping Agency", 1994, IEEE, pp. 281–288.*

* cited by examiner

*Primary Examiner*—Greta Robinson
*Assistant Examiner*—Harold E. Dodds, Jr.
(74) *Attorney, Agent, or Firm*—Raymond Y. Chan; David and Raymond

(57) ABSTRACT

A method of converting a geospatial database into a compressive database for multiple dimensional data storage by constructing computer storage data language or format includes the steps of partitioning the geospatial database into a plurality of data segments; selecting a specific point position in each of the data segments as a reference point position (RPP), and then forming a set of reference point positions for the original geospatial database; providing a coordinate origin point for each of the data segments; converting the geodetic coordinates of the original geospatial database within each of the data segments into corresponding local coordinates, and converting the set of reference point positions and the local geodetic coordinates of each of the data segments into pixel coordinates in form of a pixel coordinate system to form a specific digital map database.

38 Claims, 15 Drawing Sheets

Performance Measurement  $E = \dfrac{\|Database\ A\|}{\|Database\ B\|}$

METHOD OF CONVERTING GEOSPATIAL DATABASE INTO COMPRESSIVE DATABASE FOR MULTIPLE DIMENSIONAL DATA STORAGE

CROSS REFERENCE OF RELATED APPLICATION

This is a regular application of a provisional application having an application number of 60/168,183 and a filing date of Nov. 27, 1999.

BACKGROUND OF THE INVENTION

1. Field of the Invention

The present invention relates to a computer data converting process, and more particularly to a method and system for converting or constructing computer storage data language or format or method to be utilized by a user.

2. Description of Related Arts

A database is a collection of information elements that are accessible by many users. More commonly, the accessible database is generated in a general sense for different level users or applications. The data storage performance, such as database size, ease-to-access, and ease-to-query, is not critical issue in a general sense.

Specifically, an individual application of the accessible database can be any type, or a combination of types, of application, such as, data transmission, data display, data accesses and query, and the like. Due to the poor performance of the general-purpose database, the most common task for each individual application is to create a data digital converting processing to translate the accessible database from a general sense language to an understandable language for the individual application to meet the special requirement.

The digital data converting processing is to convert the general-purpose database elements to compressive database elements.

Some database applications access the general sense database directly without any data conversion processing under the assumption that either the general-purpose database is very closed to the desired compressive database or the performance of the compressive database is not a critical issue.

A data converting processing is necessitated by most applications not only to understand the general-purpose database, but also to enhance the application performance, achieve the desired balance of cost and extend the application availability.

In the recent applications; the data converting processing is rarely used in data processing industry. In the Internet area or in the e-commerce field, the data transmission is the fundament element. A big volume of data stored in the host computer is transmitted to many individual clients by the general-purpose data storage language without the consideration of the data specific requirement. From hardware stand point of view, although many inventions are employed to increase the transmission performance, however, much redundancy information is transmitted throughout the Internet, which not only wastes the limited resource but also breaks the business budget.

A geospatial database has a big volume of spatial and text data which are organized in a file system or in tabular fashion. The data can be used by the user to query spatial information and associated features and text descriptions. Due to the amount of a geospatial database, there exists difficulty to download the database to some application platform like palm PC with limited memory resource. Geospatial database is generated in a general sense. For the specific application, the geospatial database needs to be converted into a specific language or format to be utilized by a user to enhance the application performance, so as to achieve the desired balance of cost and extend the application availability.

Current existing systems used to deal with the geospatial database employ expensive data storage devices to store the geospatial database. A state-based geospatial database is about Gigabyte data size, however, current the most power data storage device is only on Megabyte data size level. The hardware solution is not only expensive, but sometimes is impossible.

SUMMARY OF THE INVENTION

A main objective of the present invention is to provide a method of converting geospatial database into compressive database for multiple dimensional data storage, so as to enhance the application performance and to achieve the desired balance of cost and extend the application availability. The database size is shrunk after performing data conversion so that the requirements on hardware are reduced.

Another objective of the present invention is to provide a method of converting geospatial database into compressive database for multiple dimensional data storage, which creates a compressive database from a given general-purpose database and generates an application database from a provided database to enhance the application performance, so as to achieve the desired balance of cost and extend the application availability.

Another objective of the present invention is to provide a method to evaluate the efficiency and performance of the data conversion process and the compressive database generated by the data conversion process.

Another objective of the present invention is to provide a method to translate the language of general geospatial database to the compressive language and to achieve a minimum database storage size and the maximized database accesses and query performance.

Another objective of the present invention is to provide a method to convert geospatial database in a general sense to a Compressive Multiple Dimensional Geospatial Database after a coordinate transformation.

Another objective of the present invention is to provide a compressive data storage structure to convert geospatial database in a general sense to a Compressive Multiple Dimensional Geospatial Database to meet application requirement.

In order to accomplish the above objectives, the present invention provides a method for converting a general geospatial database into a specific database for compressive two or more dimensional data storage, which comprises the following steps.

(a) Determine a final maximum display resolution on a selected physical display device (such as a palm PC) having a display area by analyzing an available storage size in the physical display device, an original geospatial database having two or more dimensional geodetic coordinates, and a related cost to increase the storage size.

(b) Partition the two or more dimensional geodetic coordinates of the original geospatial database into a plurality of data segments, wherein each of the data segments is fully or partially displayed within the display area of the physical display device according to a selected zooming (scaling) factor.

(c) Select a specific position in each of the data segments as a reference point position (RPP) or referring thereto as a reference coordinate origin point (RCOP) for an entire respective data segment, and then form a set of RPP for the original geospatial database.

(d) Provide a local coordinate system for each of the data segments respectively. Each of the local coordinate systems uses the RPP determined in step (c) as a coordinate origin point. Convert all the dimensional geodetic coordinates of the original geospatial database within the respective data segment into the corresponding local coordinates, each of which has a local position relationship with respect to the original coordinate of the respective data segment.

(e) Convert a set of the reference point positions and the local geodetic coordinates of each of the data segments to pixel coordinates in the form of a pixel coordinate system to form a specific digital map database, wherein each of the data segments is converted from a double precision format to a short precision format.

DETAILED DESCRIPTION OF THE PREFERRED EMBODIMENT

Referring to FIGS. 1 to 15, a method for converting a general geospatial database into a specific database for compressive two or more dimensional data storage according to a preferred embodiment of the present invention is illustrated, wherein a specific database 30 is derived from a given general-purpose database 10. The general-purpose database 10 is first filtered by means of a data conversion process 20 and then a new language for a specific application is generated, which is presented by the specific database 30.

From the application of a general-purpose database standpoint, in order to enhance the application performance, achieve the desired balance of cost and extend the application availability based on the given general-purpose database, the main point to create the data converter is the evaluation of the data converter.

The major departure of the present invention is derived from the structure of the application requirement to construct the applicable database from the given general-purpose database and to create a specific language to describe or understand the converted database.

Figure 1:
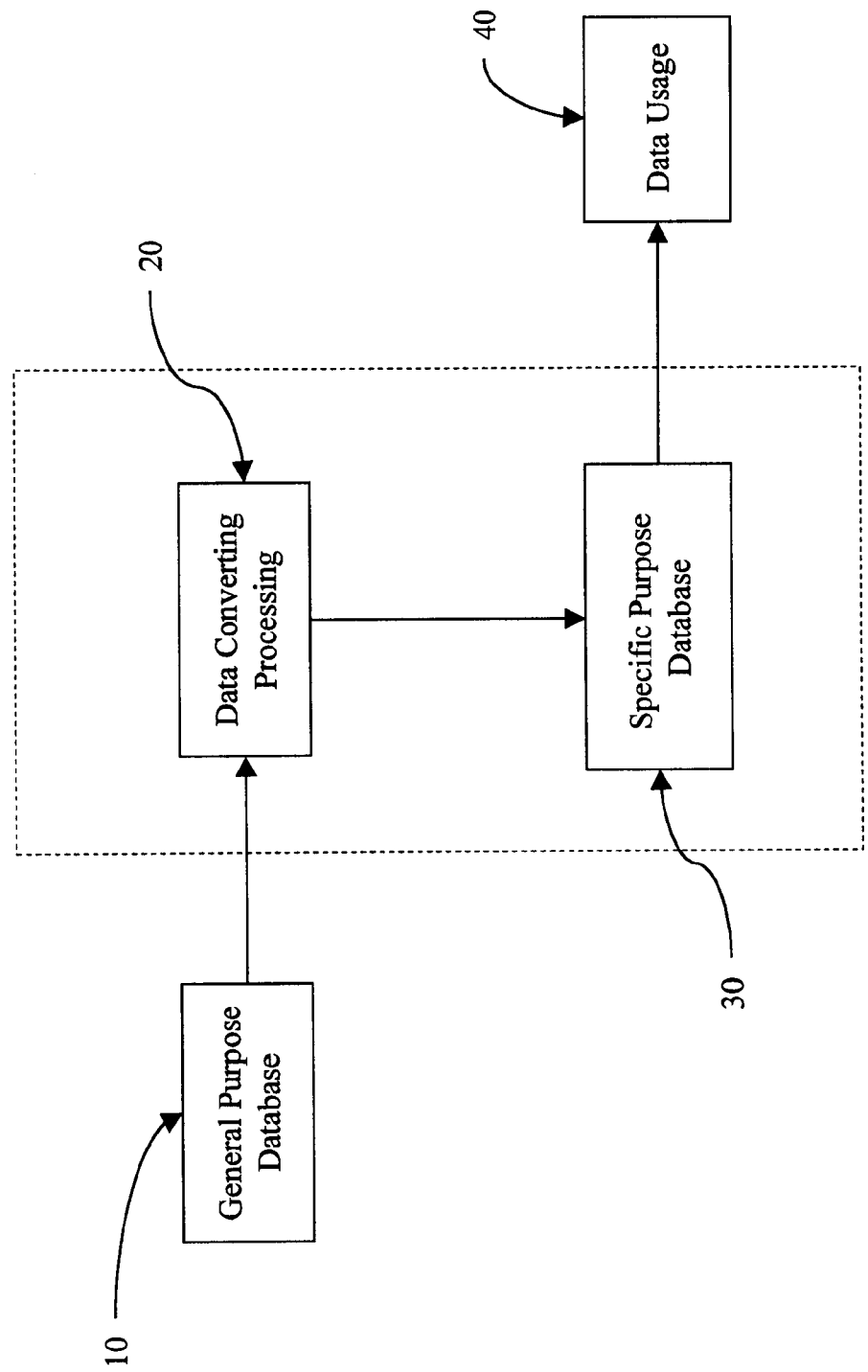
FIG. 1 is a block diagram of a method of converting geospatial database into compressive database for multiple dimensional data storage according to a preferred embodiment of the present invention.
Figure 2:
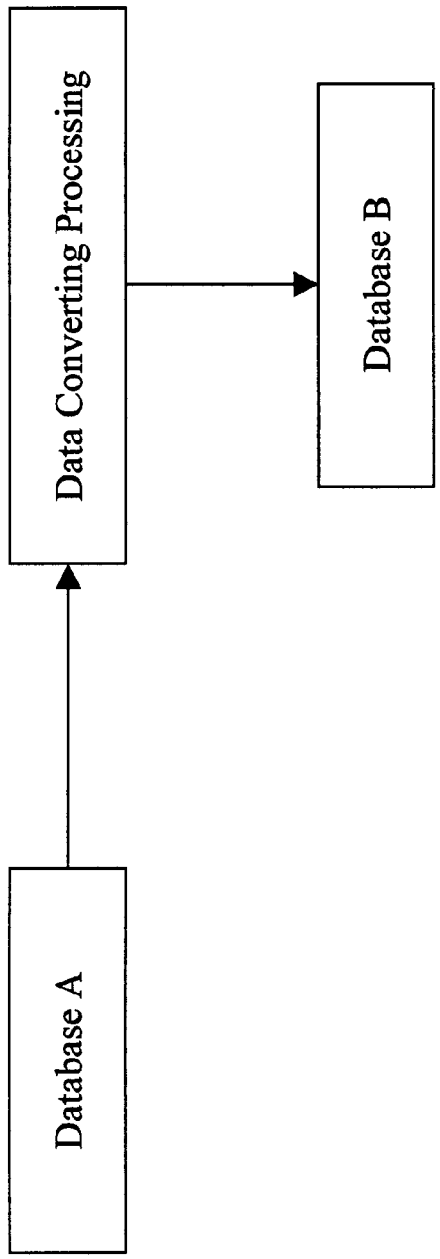
FIG. 2 is a block diagram illustrating the basic concept to evaluate the performance and the efficiency of the generated database by the method of converting geospatial database into compressive database for multiple dimensional data storage according to the above preferred embodiment of the present invention.

FIG. 2 illustrates the basic concept on how to evaluate the performance of the data conversion process 20.

The converting efficiency E is defined as $$E = \frac{\|\text{Database } A\|}{\|\text{Database } B\|}$$

Where the $\|.\|$ presents the measurement of efficiency of the data conversion process. In principle, the following definitions are applied to measure the performance of the data conversion process.

$E_S$: Performance measure of database storage size
$E_P$: Performance measure of database processing
$E_A$: Performance measure of database access process
$E_Q$: Performance measure of database query process
In general, it is defined that
E>1, effective data conversion process
E≦1, redundant data conversion process The basic concept is to create the data conversion process and search for a conversion efficiency to make E>1 to be true.

Figure 3:
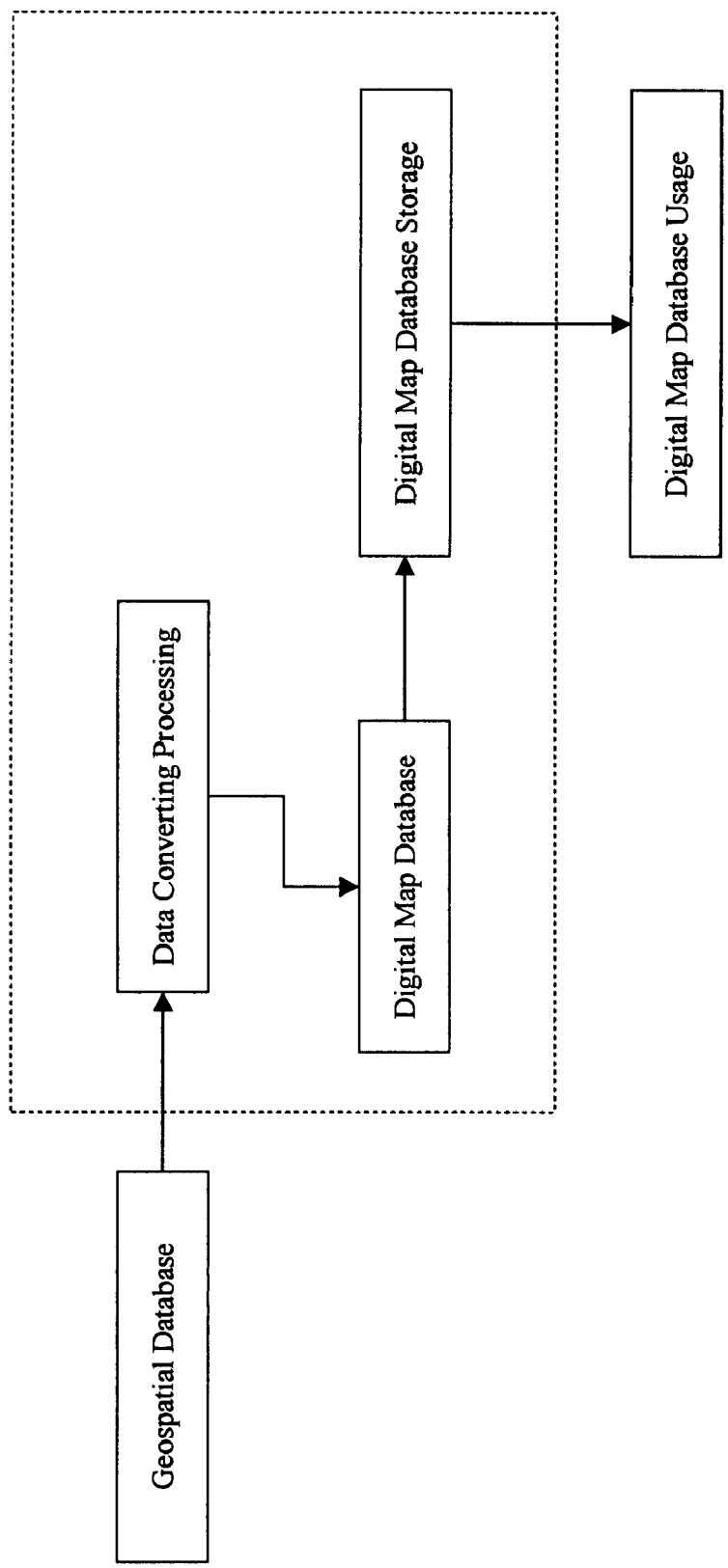
FIG. 3 is a block diagram illustrating the procedures of the method of converting geospatial database into compressive database for multiple dimensional data storage according to the above preferred embodiment of the present invention.

Referring to FIG. 3, according to the preferred embodiment, a set of a geospatial database is applied to create a digital map. According to FIG. 2, the Geospatial Database is illustrated as "Database A", the Digital Map Database is illustrated as "Database B" derived from the given Geospatial Database.

$\|\text{Database } A\|_s$: Measure of Database A storage size in the general sense.

$\|\text{Database } B\|_s$: Measure of Database B storage size in the specific sense.

It is clear that the storage and usage language for Database A or Geospatial Data is derived from the geodetic coordinate (GDC) system in which a point is presented by Longitude and Latitude coordinates.

Geodetic Coordinate (GDC) systems are based on an approximation to the shape of the Earth. The shape of the Earth was defined by classical navigators as a spherical body. More accurate geodetic coordinates require that the Earth be modeled instead as an oblate spheroid, or an ellipsoid-of-rotation. GDCs are those that relate Earth-centered angular latitude and longitude (and optionally height) to an actual point near or on the Earth's surface.

Latitude is defined to be the angle subtended with the ellipsoid's equatorial plane by a perpendicular through the surface of the ellipsoid from a point. Latitude is positive if north of the equator, negative if south. Longitude is defined as the angle measured about the minor (polar) axis of the ellipsoid from a prime meridian to the meridian through a point. It is positive if the point is east of the prime meridian, and negative if it is west. Unlike latitude, which has a nautical origin at the equator, there is no feature on the ellipsoid which forms a nautical origin for the measurement of longitude. The zero longitude can be any defined meridian. Historically, nations have used the meridian through their national astronomical observatories, giving rise to several prime meridians. By current convention, the meridian through Greenwich, England is the standard prime meridian.

The ellipsoid and the datum are the two major components of a GDC. There are many ellipsoids in use to model the Earth and any one particular ellipsoid can have its location and orientation relative to the Earth defined in different ways. The location and orientation of the ellipsoid with respect to the Earth is defined by the datum. World Geodetic System 1984 (WGS-84) defines the current US DoD standard datum.

The WGS-84 acts as the GPS receiver's reference system, and the Mean Sea Level (MSL) is the vertical datum. When the geospatial database uses a different reference system or/and vertical datum, a coordinate conversion between the different reference systems and datum must be done.

How to apply the geospatial database to create a digital map on a physical display device or unit in a more efficient way and how to store the geospatial database with minimized computer memory, i.e. to achieve the minimized database storage size and the maximized database accesses and query performance, become the main topics of the present invention.

According to the preferred embodiment of the present invention, the method for converting a general geospatial database into a specific compressive database for multiple dimensional data storage comprises the following steps.

(a) Determine a final maximum display resolution on a selected physical display device (such as a palm PC) having a display area by analyzing an available storage size in the physical display device, an original geospatial database having two or more dimensional geodetic coordinates, and a related cost to increase the storage size.

(b) Partition the two or more dimensional geodetic coordinate of the original geospatial database into a plurality of data segments, wherein each of the data segments is fully or partially displayed within the display area of the physical display device according to a selected zooming (scaling) factor.

(c) Select a specific point position in each of the data segments as a reference point position (RPP) or referring thereto as a reference coordinate origin point (RCOP) for an entire respective data segment, and then form a set of RPP for the original geospatial database.

(d) Provide a local coordinate system for each of the data segments respectively. Each of the local coordinate systems uses the RPP determined in step (c) as a coordinate origin point. Convert the two or more dimensional geodetic coordinates of the original geospatial database within the respective data segment into the corresponding local coordinates, each of which has a local position relationship with respect to the original coordinate of the respective data segment.

(e) Convert a set of reference point positions and the local geodetic coordinates of each of the data segments into pixel coordinates in the form of a pixel coordinate system to form the specific digital map database, wherein each of the data segments is converted from a double precision format to a short precision format.

EXAMPLE 1

Consider a point B1 in a three dimensional Cartesian coordinate system. The point B1 has coordinate values $(x^b=[100]^T)$ with respect to the coordinate system A. Assume that each element of the point coordinate values varies from 0 to 255. Only 3 bytes are needed to store the coordinate values of the point $B_1$ in the coordinate system A. Further consider another coordinate system B. The coordinate system B has the coordinate origin point coincident with that of the coordinate system A, and is rotated by an angle of 30 degrees along the z-axis in a counterclockwise direction with respect to the coordinate system A. The coordinate values of the point B1 with respect to the coordinate system B are then expressed as $x=[0.866025\ 0.5\ 0.0]^T$. 24 bytes are needed to store the coordinate values of the same point B1 as a double precision floating point number format without the precision loss of the coordinate value.

EXAMPLE 2

Consider a segment of a street record stored in an ESRI (Environment Systems Research Institute) shape file, which consists of a set of longitude and latitude coordinates. For example, it has three points: P1-(−180°05.0001', 24°34.0502'), P2-(−180°05.0003', 24°34.0512'), and P3-(−180°05.0006', 24°34.0524'). For this street segment, 48 bytes are needed to store the data. If the first point P1 is selected as the reference point position, then the successive two points P2 and P3 can be expressed as RP1-(−0.0002', 0.0010'), and RP2-(−0.0005', 0.0022') in the local coordinate system. If a scaling factor 10000 is introduced, then RP1 and RP2 can be expressed as (−2, 10), (−5, 22), which can be stored by using only 4 bytes. The total bytes used to store the street segment are 20 bytes, where 16 bytes are for the reference point position P1 and 4 bytes for the two local coordinate points (RP1 and RP2). As mentioned in steps (b) and (c), the street segment record may belong to a data segment. Thus, the street segment RPP can be further expressed as a local coordinate point with respect to the selected reference coordinate system. And the data size can be further reduced.

Moreover, according to the preferred embodiment of the present invention, the storage and usage language for Database B or Digital Map database is the screen plane in the form of pixel coordinates for the physical display device and the display area is the surface area of the screen plane.

The coordinates of a point in the screen plane in the form of pixel coordinates are described in integer precision format. The screen plane covers the area of 640×480 for the VGA or of 1024×780 for a super VGA.

For the conventional geodetic coordinates, a 64-bit word (double format) is required to make up the Longitude and Latitude coordinates that results in $\|\text{Database } A\|_s = 64$ According to the present invention, in the digital map database, the pixel coordinate system is applied once the digital map is displayed on the physical display device. Based on the current most powerful display device, the display area can be covered by a 10-bit word (short format) that leads to $\|\text{Database } B\|_s = 10$ Combining the above results gives the performance measure of database storage $$E_S = \frac{\|\text{Database } A\|_S}{\|\text{Database } B\|_S} = \frac{64}{10} = 6.4$$

From the above conclusion the conversion efficiency of the data storage language from Longitude and Latitude coordinates to graphic pixel coordinates is about 6.4 which shows that the performance of the specific database is much improved.

From the performance measure of database processing, there is another benefit after the data conversion process of the present invention. To access and query the Longitude and Latitude coordinates the performance measure of database processing is computed by $\|\text{Database } A\|_P = $ Performance of float processor In the pixel coordinates, the performance measurement of database processing is computed by $\|\text{Database } B\|_P = $ Performance of integer calculation The performance measure of database processing for the data conversion process is established as $$E_P = \frac{\|\text{Database } A\|_P}{\|\text{Database } B\|_P} = \frac{\text{Performance of float processor}}{\text{Performance of Integer Calculation}}$$

In some applications or on some application platforms there is no hardware supported float processor. This makes the processing of double format impossible or gives a bad performance by a software simulator.

For the application platforms without a hardware supported float processor, the performance measure of database processing for the data conversion process is $E_P \gg 1$ For the application platform with hardware supported float processor, the performance measurement of database processing for the data conversion process is estimated as $1 \leq E_P \leq 2$ From the performance measure of the database processing standpoint, the data conversion process of the present invention leads to the increase of the speed of data processing and the improvement of the application system performance.

Figure 4:
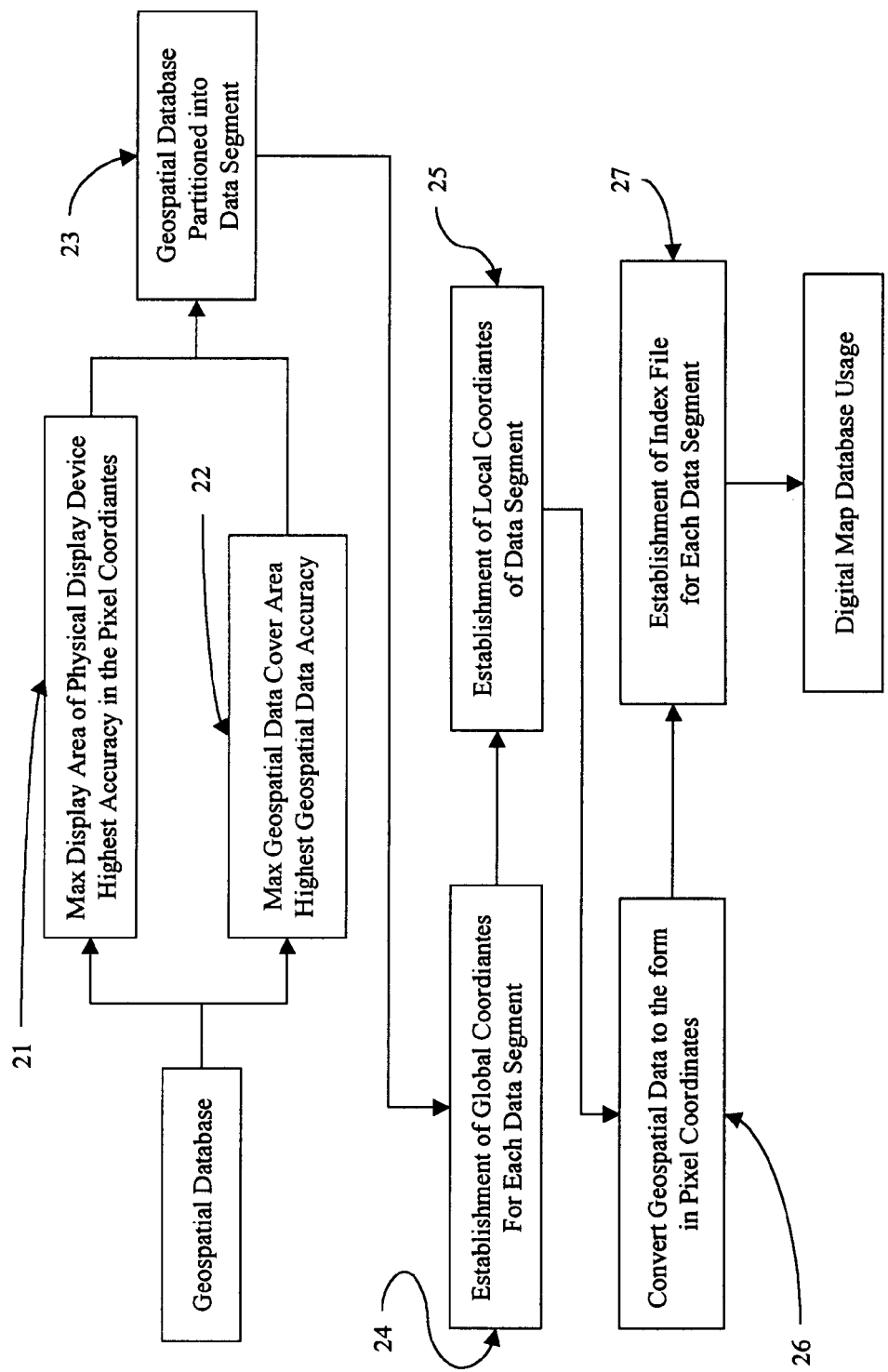
FIG. 4 is a block diagram illustrating the procedures for creating the pixel-based plan of the method of converting geospatial database into compressive database for multiple dimensional data storage according to the above preferred embodiment of the present invention.
Figure 5:
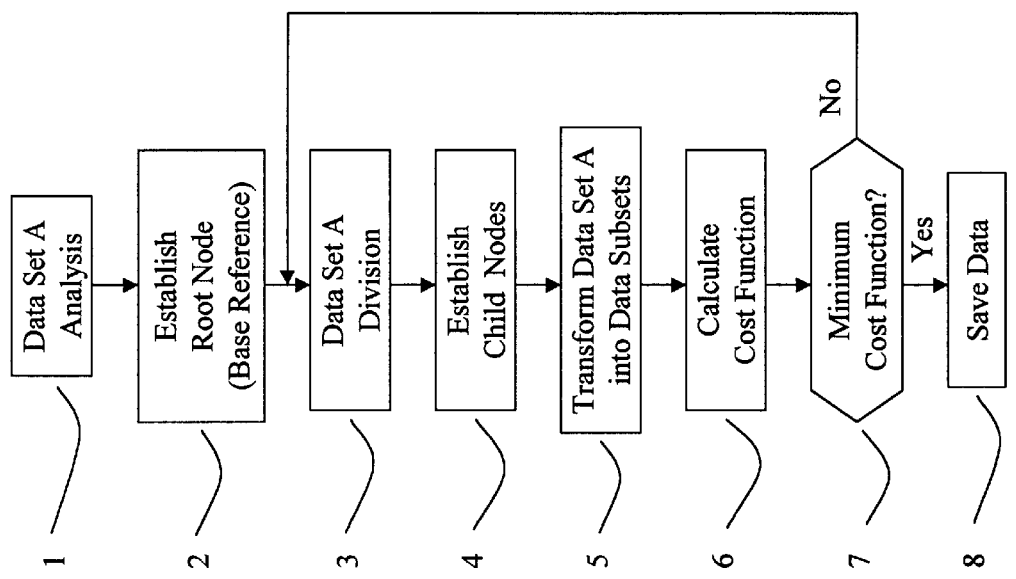
FIG. 5 is a block diagram illustrating the functions of the hierarchical compression operation method of map data in the method of converting geospatial database into compressive database for multiple dimensional data storage according to the above preferred embodiment of the present invention.

The performance measure of the data access and query depends on the structure of the data storage language. In general, the performance of data access and query is not considered in a general sense. After the data storage language reconstruction, the performance of data accesses and query can be easily improved which leads to $E_A \gg 1$ $E_Q \gg 1$ FIG. 4 illustrates the procedure to create the pixel-based plane. FIG. 5 provides the flowchart of the data conversion processing.

The general geospatial database is created in the form of geodetic Latitude and Longitude coordinates. In the digital map database, the pixel coordinate system is applied once the digital map is displayed on the physical display device. According to the preferred embodiment of the present invention, the specific database needs to be derived from the geospatial database to display the digital map in the physical display device. The procedure defines that the data conversion process is from the language or format of geodetic Latitude and Longitude coordinates to the language or format or form in the pixel coordinates. There are several steps to complete the data conversion process. FIGS. 6 to 11 are used to describe the detailed process of the establishment of two or more application databases and the creation of the pixel-based plane.

According to the preferred embodiment of the present invention, the above step (a) further comprises the following steps.

(a-1) Calculate the maximum display area of the selected physical display device to reach the best performance. Physically the maximum display area of the selected physical display device or unit is 640×480 for the VGA or 1024×780 for a super VGA.

(a-2) Find out or calculate the maximum scaling factors in the form of two or more dimensional geodetic coordinates (for example, longitude and latitude) in order to enhance system performance, wherein this step (a-2) is determined by the geospatial database resolution.

To clearly describe the step (a-2), consider the example 2 mentioned above. A street segment record with three points: P1-(−180°05.0001', 24°34.0502'), P2-(−180°05.0003', 24°34.0512'), and P3-(−180°05.0006', 24°34.0524') is converted into a RPP (−180°05.0001', 24°34.0502') and two local coordinate points: RP1 (−2, 10) and RP2 (−5, 22) at the accuracy of 0.0001 (i.e. 1/10000), which is stored by using 20 bytes. If the accuracy is reduced in the form of two or more dimensional geodetic coordinates, for example, to the accuracy of 0.001 (1/1000), then the two successive points can be expressed as (0.000', 0.001') and (−0.001, 0.002). Introduce a scaling factor 1000. Then, RP1 and RP2 can be expressed as (0, 1) and (−1, 2), which can be stored by using only 2 bytes. The total bytes used to store the street segment are reduced to 18 bytes, where 16 bytes for the reference point position P1 and 2 bytes for two local coordinate points (RP1 and RP2).

(a-3) Determine the maximum accuracy in the form of pixel coordinates for geospatial data points to reach the maximum accuracy in the form of two or more dimensional geodetic coordinates. In which, it is determined that the real size in the form of two or more dimensional geodetic coordinates can be presented by the maximum display area of the selected physical display device or unit without the loss of accuracy. The related cost to increase the available storage volume is also taken into account to determine the maximum accuracy in the form of pixel coordinates.

Figure 8:
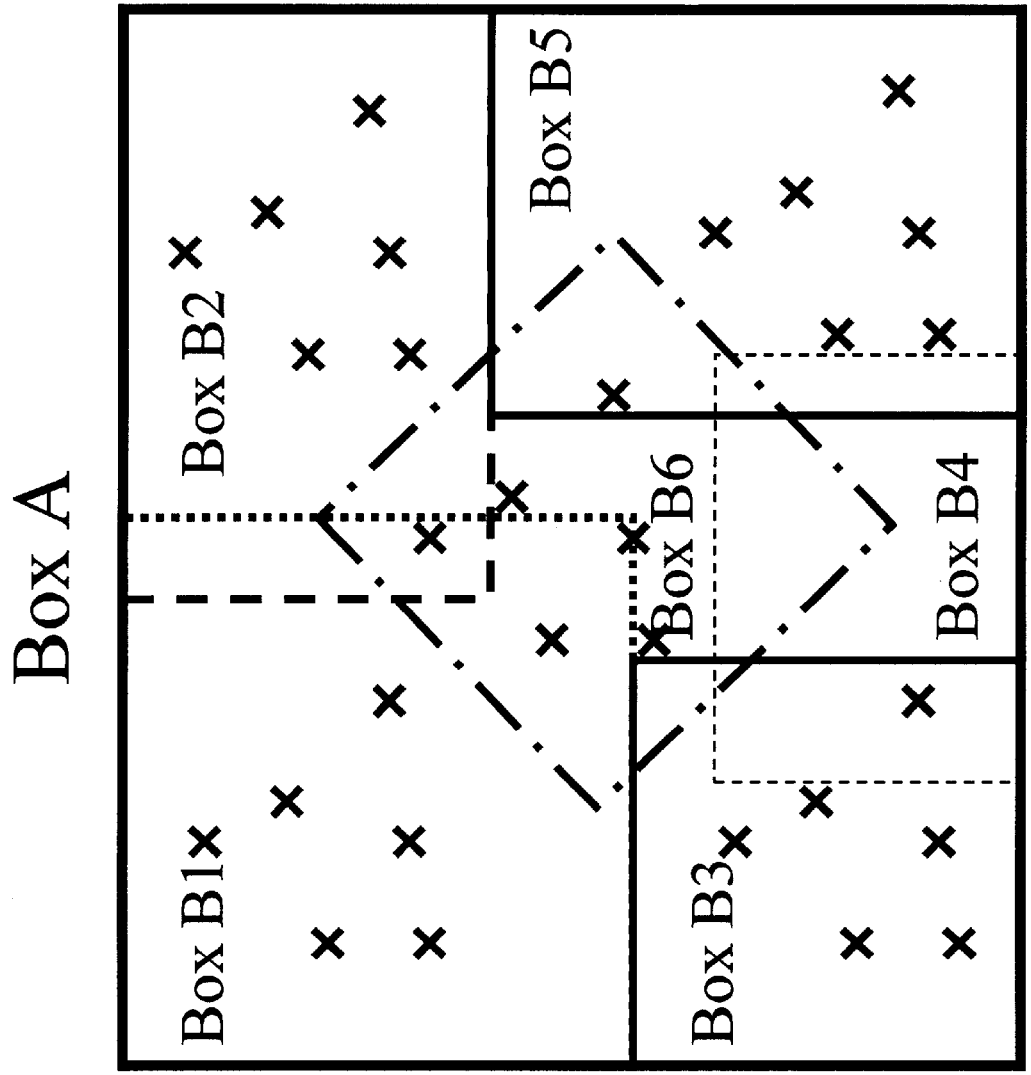
FIG. 8 illustrates the division of the data set A into several data subset according to a given criterion, according to the method of converting geospatial database into compressive database for multiple dimensional data storage of the above preferred embodiment of the present invention.

In step (b), the geospatial database is optimally partitioned into the plurality of data segments based on the real size in the form of two or more dimensional geodetic coordinates represented by the maximum display area of the selected physical display device or unit without the loss of accuracy. Each of the data segments is fully or partially displayed under the maximum display area of the selected physical display device or unit without loss of any accuracy. The block diagram for this step is illustrated in FIG. 8.

The above step (c) further comprises the following substeps:

(c-1) Analyze the general geospatial database in a global coordinate system in the form of two or more dimensional geodetic coordinates to uniquely present the partitioned data segments; and (c-2) Find out or calculate the special point position (or referring to it as the reference point position RPP) in each of the data segments to represent the whole partitioned data segment. The selected reference point position (RPP) is defined as the coordinate original point for the data segment, wherein the absolute position of each of the data segments is exactly described by its original point in the form of two or more dimensional geodetic coordinates.

In the step (d), the local position relationship is with respect to its original point in the sense of double float format. The relationship of the local coordinates can be translated to the global coordinates.

$$\eta_{local} = [T] \cdot \eta_{original}$$

where $\eta_{local}$ presents the local coordinate, and $\eta_{original}$ presents the original coordinate of the selected point. The matrix $[T]$ is the translation matrix from the global to the local coordinates.

In the step (e), each of the data segments in the form of the two or more dimensional geodetic coordinates is converted into the form of the pixel coordinate system.

$$\zeta_{Pixel} = [T_{GP}] \cdot \eta_{local}$$

where $\zeta_{Pixel}$ is in the form of the pixel coordinate system. The converting matrix $[T_{GP}]$ is applied to convert the data segment in the sense of double precision format to the data segment in the sense of a short precision format.

Physically, the step (e) completes a coordinate conversion from the form of two or more dimensional geodetic coordinates to the form in the pixel coordinate system. The converting matrix $[T_{GP}]$ is the bridge for the coordinate conversion processing from the geodetic space to the pixel space.

Figure 6:
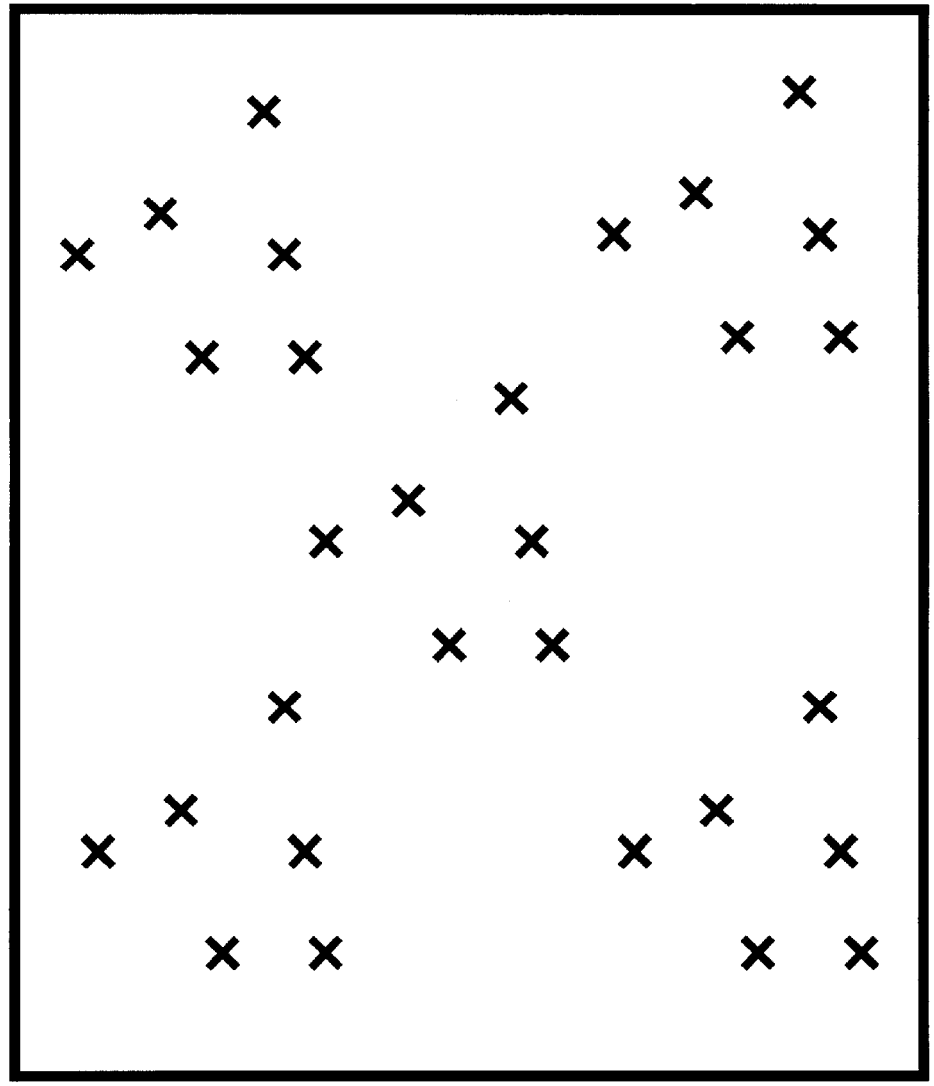
FIG. 6 illustrates a sample of data set A (such as map data), which will be analyzed and processed, according to the method of converting geospatial database into compressive database for multiple dimensional data storage of the above preferred embodiment of the present invention.
Figure 7:
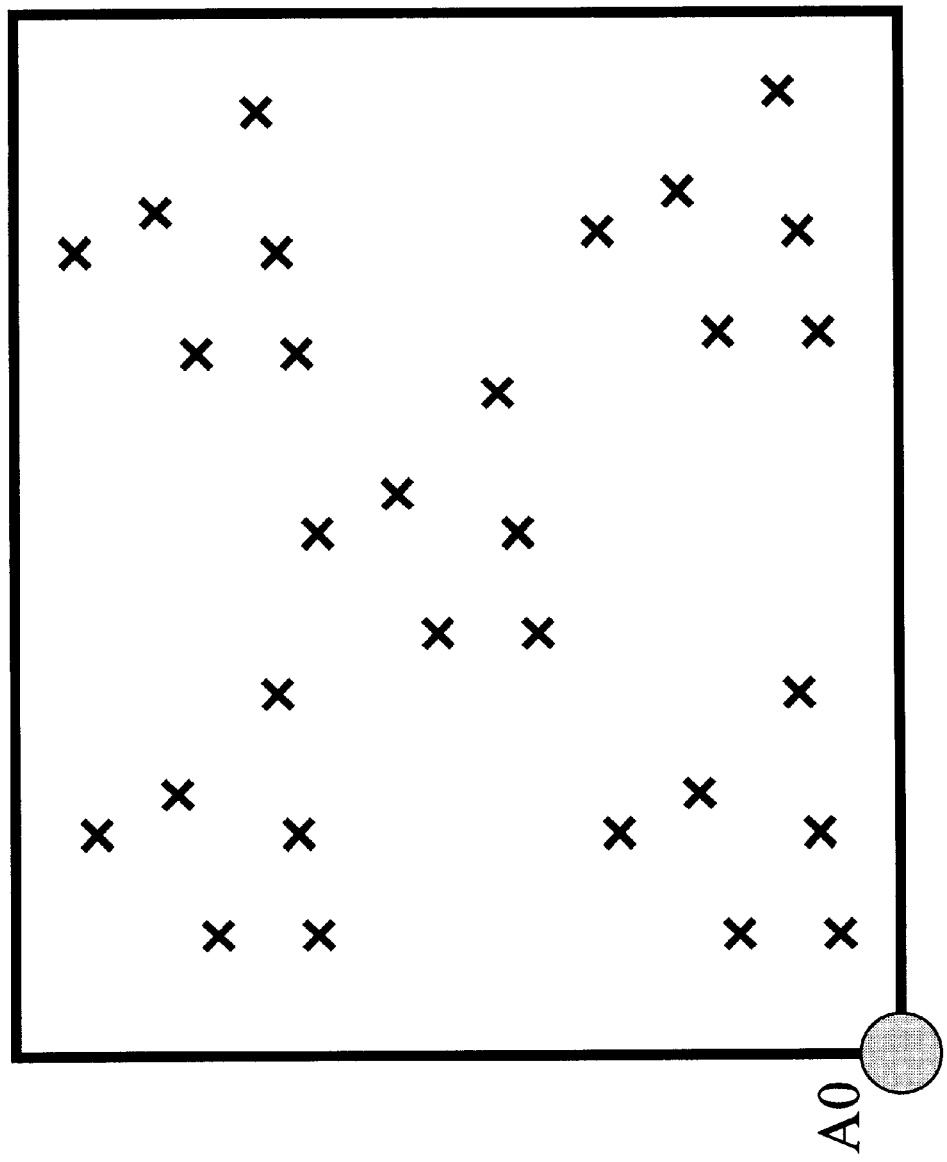
FIG. 7 illustrates the establishment of base coordinate system and the reference point in the data set A, according to the method of converting geospatial database into compressive database for multiple dimensional data storage of the above preferred embodiment of the present invention.

FIG. 6 illustrates a sample of data set A (such as map data), which is analyzed and processed in the step (a). FIG. 7 illustrates the establishment of the base coordinate system and the reference point in the data set A, which are the steps (a) to (e), wherein the point A0 is selected to be the specific point position, i.e. the reference point position (RPP).

Figure 9:
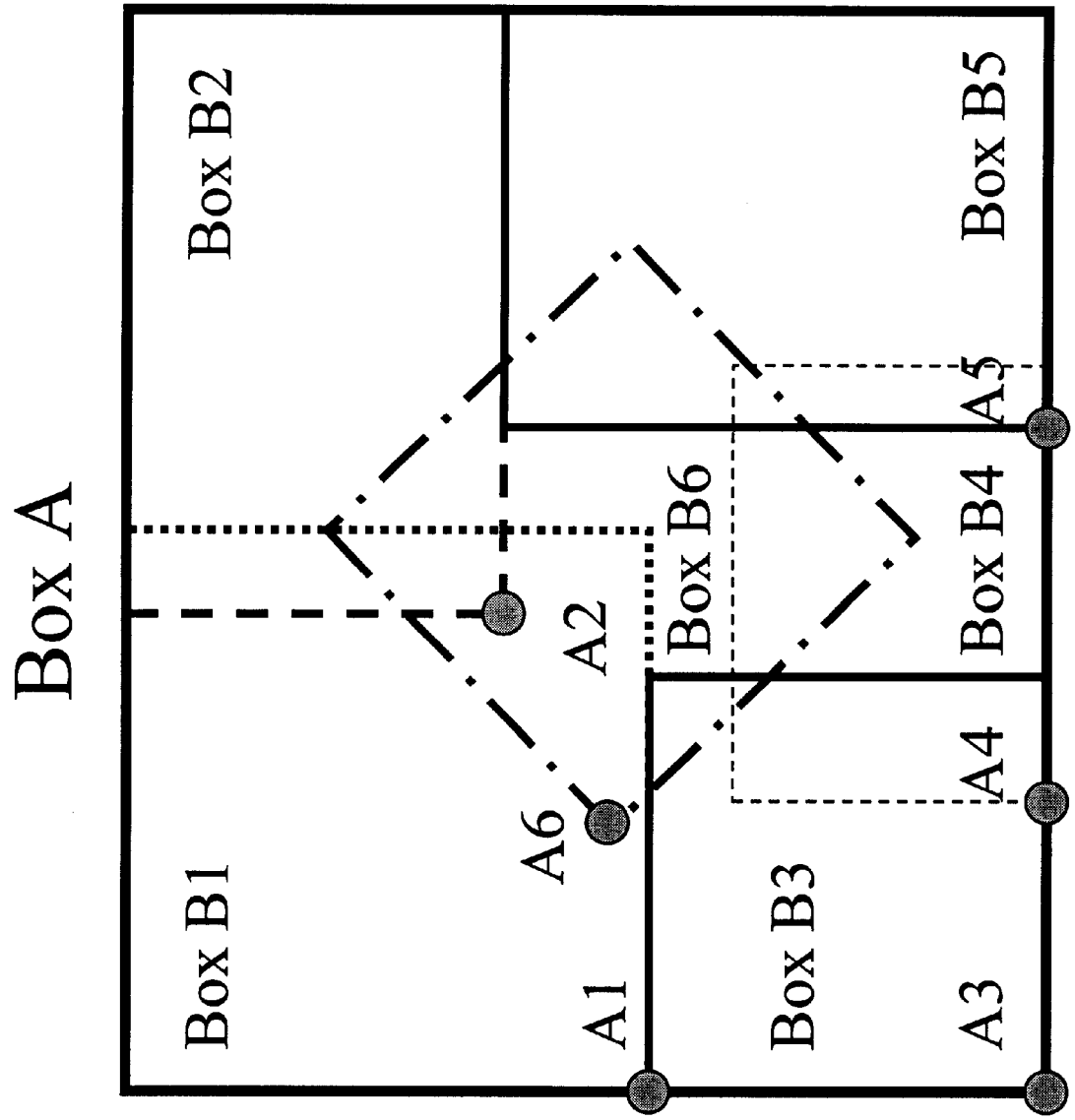
FIG. 9 illustrates the establishment of subcoordinates system and reference points for the data subsets obtained in FIG. 8, i.e. the establishment of child nodes in the data set A, according to the method of converting geospatial database into compressive database for multiple dimensional data storage of the above preferred embodiment of the present invention.
Figure 11:
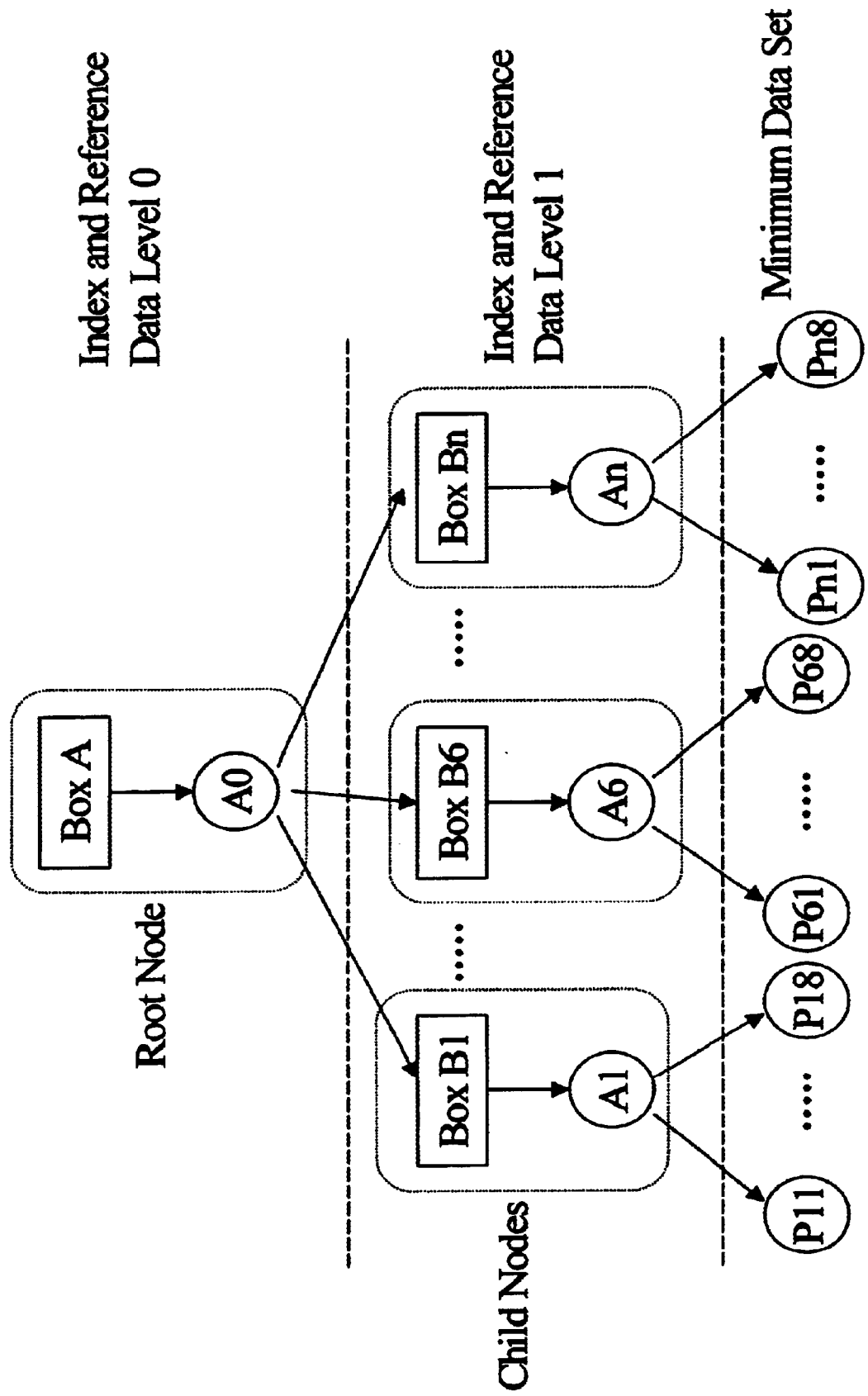
FIG. 11 illustrates the new hierarchical data storage structure of the method of converting geospatial database into compressive database for multiple dimensional data storage according to the above preferred embodiment of the present invention.

FIG. 8 illustrates the division of the data set A into several data subsets according to a given criterion function. FIG. 9 illustrates the establishment of a subcoordinates system and reference points for the data subsets obtained in the FIG. 8, i.e. the establishment of child nodes in the data set A. FIG. 0.10 illustrates the transformation of data set A into data subset B6. FIG. 11 illustrates the new hierarchical data storage structure in the present invention.

After the step (e), the performance measure of data storage size $$E_S = \frac{\|\text{Database } A\|_S}{\|\text{Database } B\|_S} = \frac{64}{10} = 6.4$$

is achieved.

After the step (e), in order to dramatically affect the speed of access and query the created digital map database, the present invention further comprises an additional step (f) of establishing an index file associated with the step (a) to the step (e) data conversion process.

The step (f) is used to improve the performance of data access and query to make $$E_A \gg 1$$
$$E_Q \gg 1$$

to be true.

As shown in FIG. 5, the implementation of the present invention includes seven modules, i.e., a data set analysis module 1, a base reference coordinate system generation module 2, an original data set division module 3, a child reference coordinate system generation module 4, a data transformation module 5, a cost (criterion) function selection and calculation module 6, a cost function comparison module 7, and a data storage module 8.

Any one of the data sets can be considered as a point in a specific parameter space, which can be a space with any dimensional numbers according to the requirements of a specific problem. As we know, the same parameter space can be described by means of different coordinate systems. A point in the parameter space can also have different expressions. There are certain relations among the different coordinate systems. We can define the relation from a coordinate system A to a coordinate system B in the parameter space as a mapping, which is denoted as

R: A ⇒ B

The expression of a point P in a coordinate system, e.g., the coordinate system A, is also referred to as the coordinate value. The complexity of an expression of the same point P with respect to different coordinate systems in the specific parameter space varies. Therefore, there must exist a coordinate system, with respect to which the point P has the simplest expression. Then, this is the means to reduce the data storage size, i.e., we use the simplest expression to denote or record the same point or a data set.

Generally, there are two kinds of coordinate transformations between any two coordinate systems in a two or more dimensional coordinate system, i.e. translation transformation and rotation transformation.

As an example, we consider the general coordinate transformations in a three Cartesian coordinate system. Assume that the coordinate system $x_b y_b z_b$ is translated by $x_0$ with respect to the base coordinate system xyz and is rotated around the x-, or y-, or z-axes. Then, the coordinate value $x^b$ of a point P with respect to the coordinate system $x_b y_b Z_b$ can be transformed into the expression x in the base coordinate system xyz as shown below $$x = x_0 + R x^b$$

where the rotation transformation matrix R around the x-, y-, and z-axes is employed to represent the processing of the coordinate or function space translation.

A set of coordinate variables is established by defining the orientation angles relative to a rectangular coordinate frame. Roll, pitch, and yaw (RPY) can be defined as the angles ($\gamma$, $\beta$, and $\alpha$) of rotations about the x-, y-, and z-axes, respectively, relative to a reference coordinate system. The coordinate transformation RPY is expressed in terms of the angles of roll ($\gamma$), pitch ($\beta$), and yaw ($\alpha$) defined with respect to a reference coordinate frame whose axes are parallel to the respective axes of the base coordinate system, and can be expressed as shown below by means of successive rotational operations:

$$RPY(\gamma, \beta, \alpha) = R_z(\gamma) R_{y'}(\beta) R_{x'}(\alpha) = \begin{bmatrix} \cos\gamma\cos\beta & \cos\gamma\sin\beta\sin\alpha - \sin\gamma\cos\alpha & \cos\gamma\sin\beta\cos\alpha + \sin\gamma\sin\alpha \\ \sin\gamma\cos\beta & \sin\gamma\sin\beta\sin\alpha + \cos\gamma\cos\alpha & \sin\gamma\sin\beta\cos\alpha - \cos\gamma\sin\alpha \\ -\sin\beta & \cos\beta\sin\alpha & \cos\beta\cos\alpha \end{bmatrix}$$

Assume that the point P in the coordinate system $x_b y_b z_b$ has the coordinate value $x^b = [a \ b \ c]^T$. The coordinate value x of the point P in the base coordinate system xyz is obtained as $$x = \begin{bmatrix} a\cos\gamma\cos\beta + b(\cos\gamma\sin\beta\sin\alpha - \sin\gamma\cos\alpha) + c(\cos\gamma\sin\beta\cos\alpha + \sin\gamma\sin\alpha) \\ a\sin\gamma\cos\beta + b(\sin\gamma\sin\beta\sin\alpha + \cos\gamma\cos\alpha) + c(\sin\gamma\sin\beta\cos\alpha + \cos\gamma\sin\alpha) \\ a(-\sin\beta) + b(\cos\beta\sin\alpha) + c(\cos\beta\cos\alpha) \end{bmatrix}$$

The complexity in expressing the point P in the base coordinate system xyz is obviously greater than that in the coordinate system $x_b y_b Z_b$.

Figure 12:
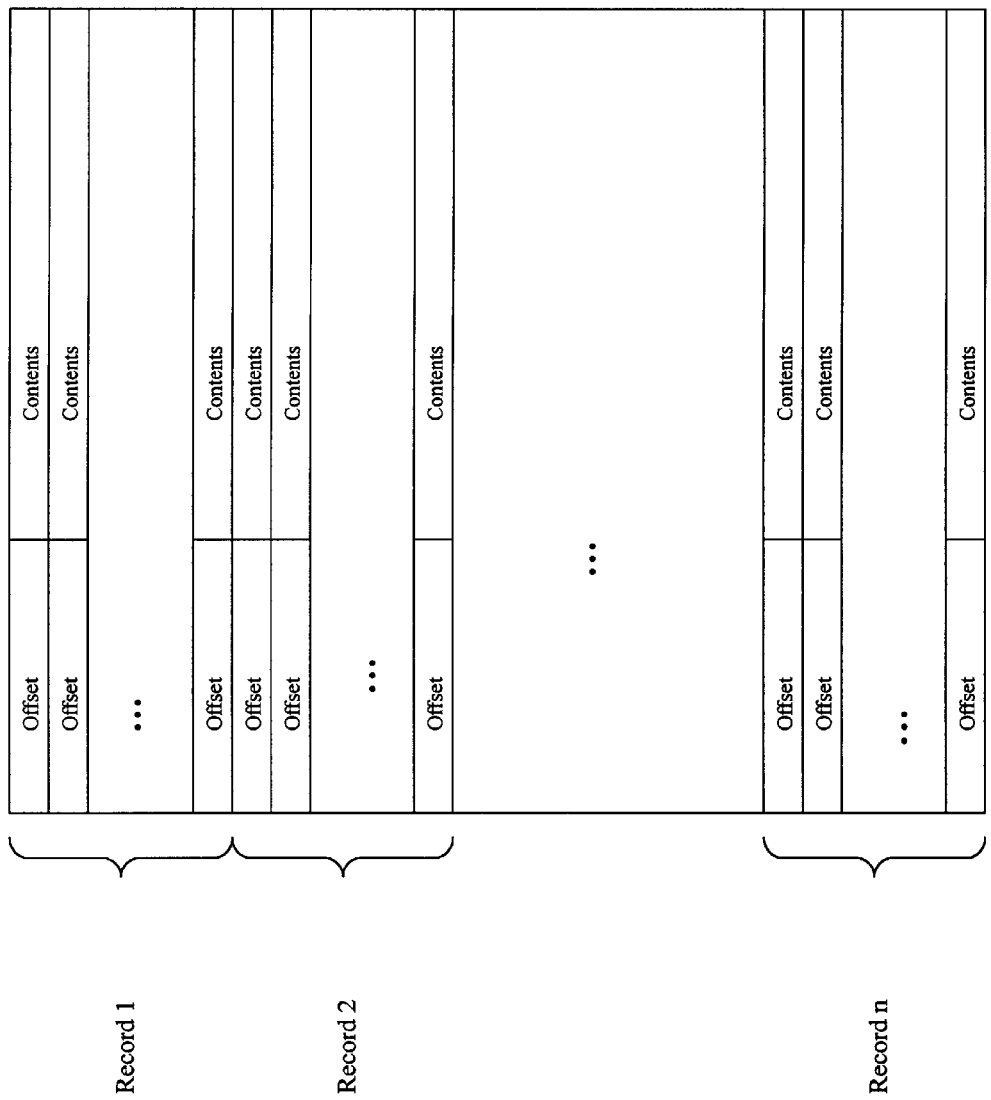
FIG. 12 is a data structure explaining the internal structure of each data segment, according to the method of converting geospatial database into compressive database for multiple dimensional data storage of the above preferred embodiment of the present invention.

FIG. 12 is a data structure explaining the internal structure of each data segment. This data structure exponentially increases the speed of data accesses and query performance. The data segment is framed from record 1 to record n. Each record consists of several offsets and contents. The offset is the index of its contents. The contents record the real data. The other file is used to record the offset of each record.

The designed storage data structure improves the performance of data access and query to make $E_A \gg 1$.

$E_Q \gg 1$ to be true.

Figure 13:
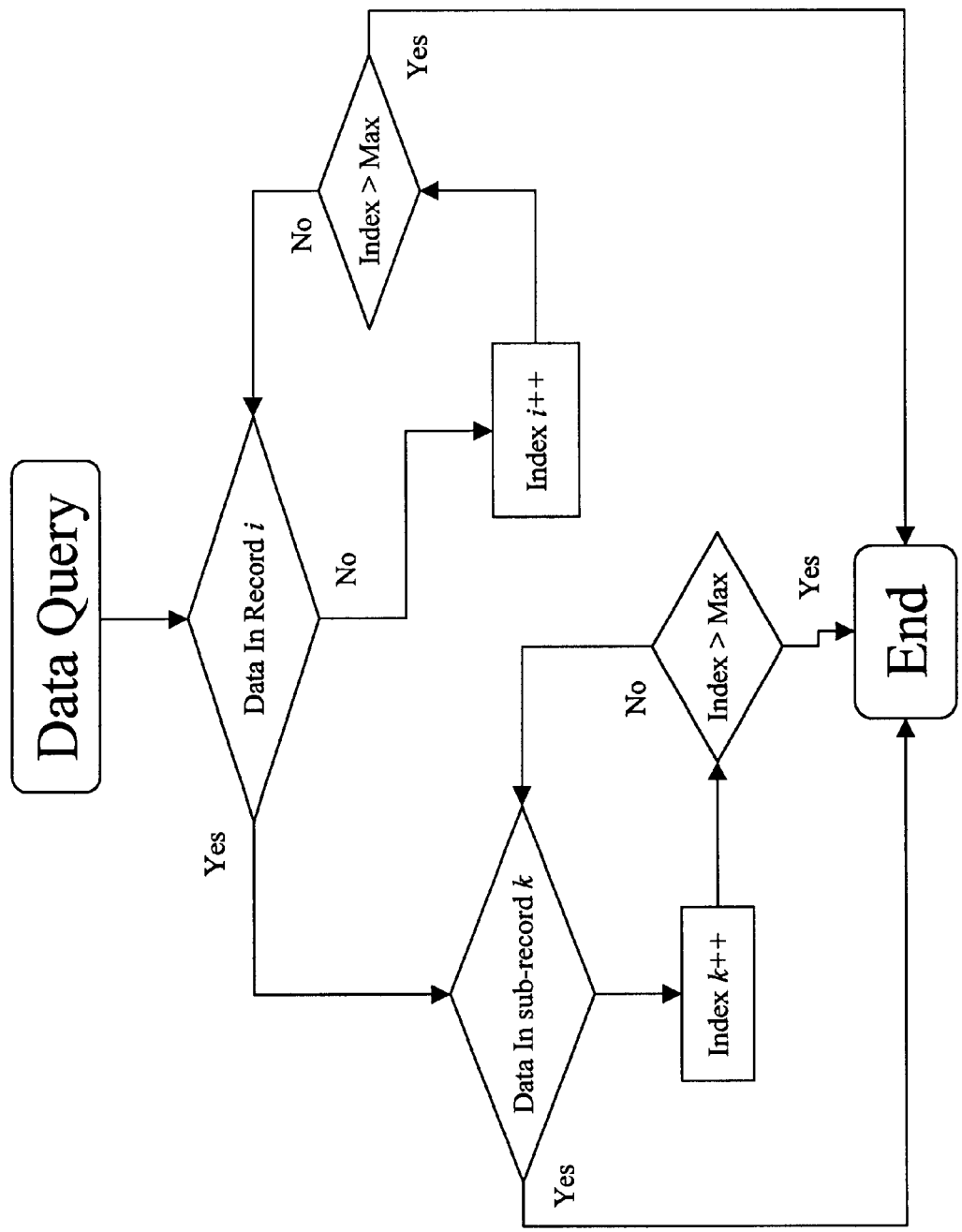
FIG. 13 is a block diagram illustrating database query operations, according to the method of converting geospatial database into compressive database for multiple dimensional data storage of the above preferred embodiment of the present invention.

FIG. 13 is a block diagram presenting the data search or query procedure. The data query procedure starts from each record. If the required data belongs to the searched record, its sub-record is searched until the data query is completed. There is a trade-off in the data structure design to achieve the best performance.

Figure 14:
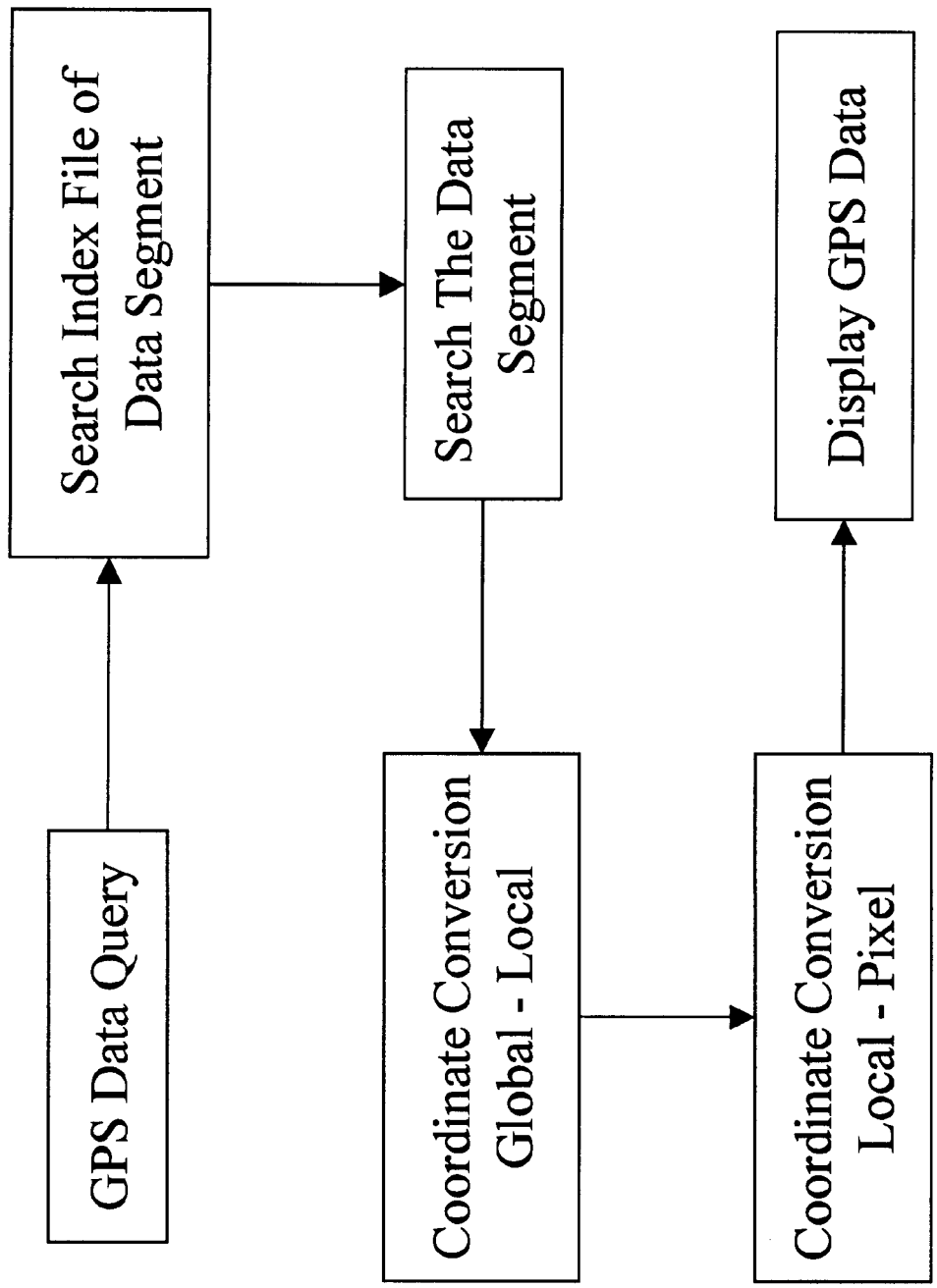
FIG. 14 is a block diagram delineating GPS based point query operation of the method of converting geospatial database into compressive database for multiple dimensional data storage according to the above preferred embodiment of the present invention.

FIG. 14 is a block diagram delineating the GPS or IMU based spatial query procedure of the present invention. The GPS or IMU based point query procedure is the revised procedure of creation of the pixel based applicable database. The procedure is from the GPS or IMU input to find the associated pixel coordinates on the display device containing a graphic representation of the data.

A spatial query is the procedure used to obtain or capture the features and attributes related to a spatial object, such as point, through a geospatial database access. The spatial object is defined through the GPS or IMU input at a specific position on a display device containing a graphic representation of the data. In order to get the information about the spatial object, the query algorithm must search the index file first.

The spatial index search in the spatial queries gives the involved data segment because the spatial index file pertains to the data segment directory. Thus, the query can be done in only the relevant data segment after the appropriate data segment has been identified.

The results from the GPS or IMU based efficient geospatial data access can be directly used to reduce the spatial search range for object queries. Suppose that the involved segment databases has several records represented as $D_i$ (i= 1,2,Λ,n). The databases are with respect to the extent [$\phi_{min}$, $\lambda_{min}$; $\phi_{max}$, $\lambda_{max}$], where n is the number of involved records. The next step in destination record finding is the sub-record searching processing.

Figure 10:
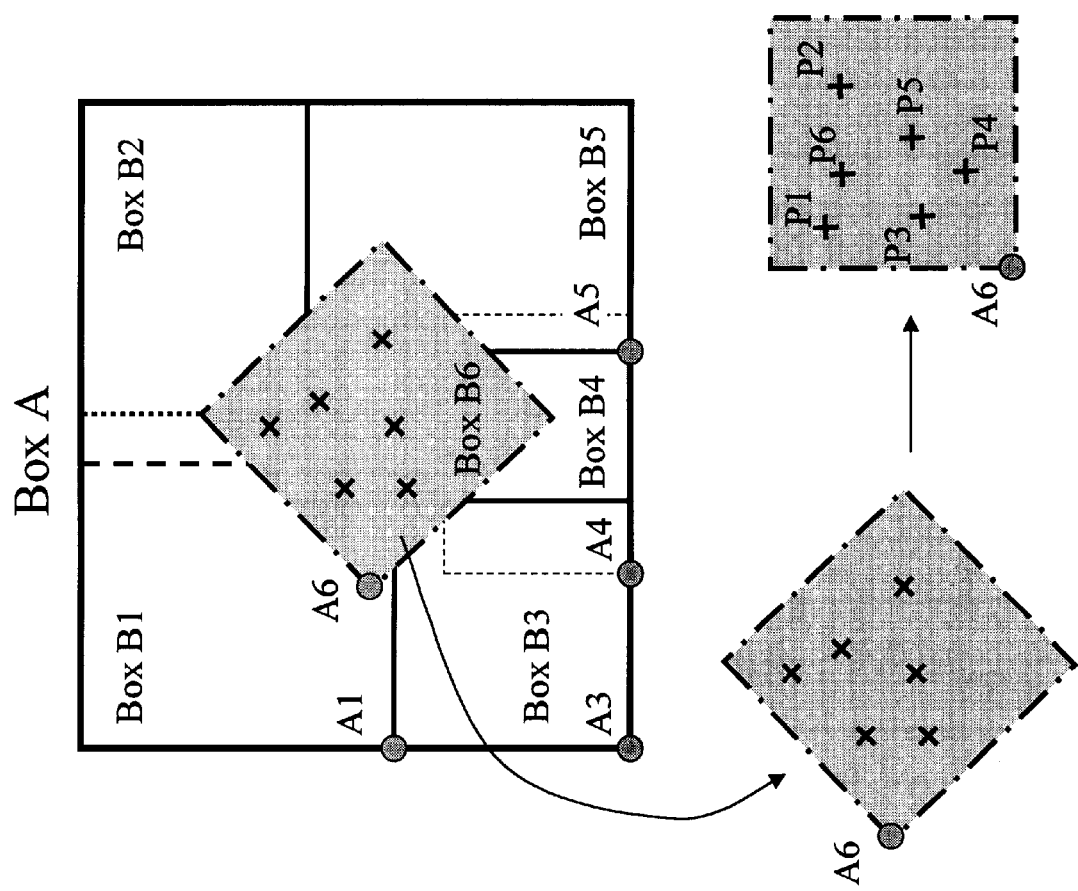
FIG. 10 illustrates the transformation of data set A into data subset B6, according to the method of converting geospatial database into compressive database for multiple dimensional data storage of the above preferred embodiment of the present invention.

FIG. 10 illustrates the transformation of the original database in the form of two or more dimensional coordinate data to the subset form in the pixel coordinate system. FIG. 13 presents the revised processing from the pixel coordinates to the geospatial data coordinates.

Figure 15:
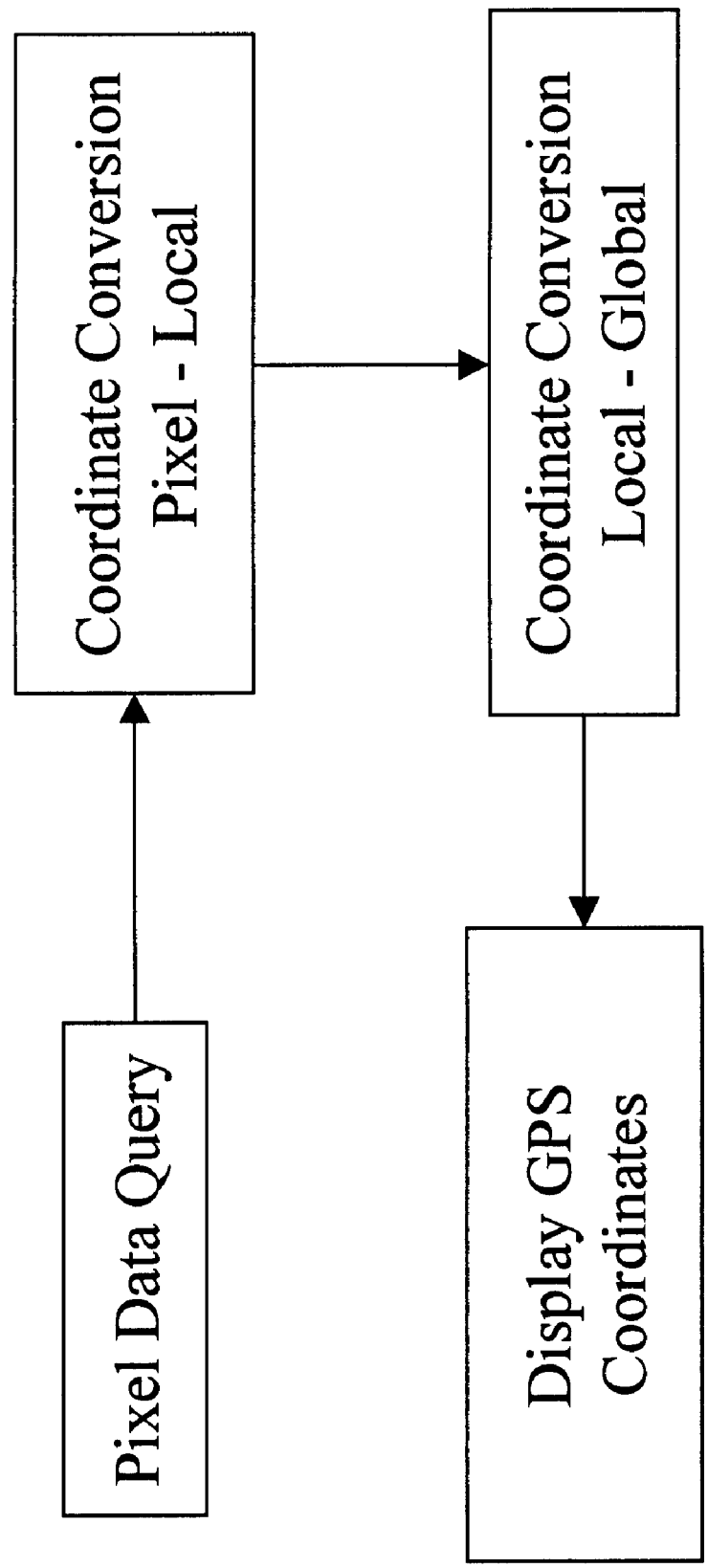
FIG. 15 is a block diagram describing the procedure to search geospatial coordinate from clicked screen input, according to the method of converting geospatial database into compressive database for multiple dimensional data storage of the above preferred embodiment of the present invention.

FIG. 15 is a block diagram describing the procedure to search geospatial coordinates from clicked screen input. Denote the coordinates of a point on the display device as [$x_s$, $y_s$] in the screen plane coordinate system, where the origin is at the upper-left corner of the screen. The coordinates of the upper-left screen corner in the Cartesian Coordinate System are denoted as [$x_0$, $y_0$]. The corresponding Cartesian coordinate of the position on the screen is given by the following vector sum:

$$[x,y] = [x_0, y_0] + [k_1 x_s, k_2 y_s]$$

In the above equation $k_1$, and $k_2$ are the scale factors along the horizontal and vertical axes, respectively. Normally the relation $k_1 = -k_2$ holds.

Next, the transformation of the point [x, y] in the plane to the point [$\phi, \lambda$] on the ellipsoid is made. There are two steps to reach the conversion.

Step 1: Convert the point [x, y] in the plane to the point [$\phi, \lambda$] in its data segment in the form of geodetic Latitude and Longitude coordinates. It is a revised processing of FIG. 4 in the step (e).

Step 2: Use the established spatial index file for spatial information retrieval. The algorithm to recover the spatial coordinates is the processing from the partitioned local coordinate system to the global coordinate system.

What is claimed is:

1. A method of converting geospatial database into compressive database, comprising the steps of:
   (a) partitioning two or more dimensional geodetic coordinates of an original geospatial database into a plurality of data segments, wherein each of said data segments is at least partially displayed within a display area of a physical display device according to at least a predetermined scaling factor;
   (b) selecting a specific point position in each of said data segments as a reference point position (RPP) for each of said respective data segments, and then forming a set of reference point positions (RPPs) for said original geospatial database;
   (c) providing a coordinate origin point for each of said data segments by using said reference point position (RPP) of each of said data segments as said coordinate origin point;
   (d) converting said two or more dimensional geodetic coordinates of said original geospatial database within each of said data segments into corresponding local coordinates, each of which has a local position relationship with respect to said original coordinate of said respective data segment, so as to form a local coordinate system for each of said data segments; and
   (e) converting said set of reference point positions and said local geodetic coordinates of each of said data segments into pixel coordinates in form of a pixel coordinate system to form a specific digital map database.

2. A method of converting geospatial database into compressive database, as recited in claim 1, before the step (a), further comprising an initial step of:
   determining a display area resolution on said display area of said physical display device by analyzing an available storage size in said physical display device and said original geospatial database.

3. A method of converting geospatial database into compressive database, as recited in claim 1, wherein said geodetic coordinates is derived from a geodetic coordinate (GDC) system in which a point is presented by Longitude and Latitude coordinates.

4. A method of converting geospatial database into compressive database, as recited in claim 2, wherein said geodetic coordinates is derived from a geodetic coordinate (GDC) system in which a point is presented by Longitude and Latitude coordinates.

5. A method of converting geospatial database into compressive database, as recited in claim 1, wherein in the step (e), each of said data segments is converted from a double precision format to a short precision format.

6. A method of converting geospatial database into compressive (database, as recited in claim 2, wherein in the step (e), each of said data segments is converted from a double precision format to a short precision format.

7. A method of converting geospatial database into compressive database, as recited in claim 1, wherein said display area of said physical display device is a surface area of a screen plane thereof.

8. A method of converting geospatial database into compressive database, as recited in claim 2, wherein said display area of said physical display device is a surface area of a screen plane thereof.

9. A method of converting geospatial database into compressive database, as recited in claim 7, wherein coordinates of a point in said screen plane in said form of pixel coordinates are described in integer precision format, wherein said screen plane covers an area of 640×480 for said VGA or of 1024×780 for a super VGA.

10. A method of converting geospatial database into compressive data base, as recited in claim 8, wherein coordinates of a point in said screen plane in said form of pixel coordinates are described in integer precision format, wherein said screen plane covers an area of 640×480 for said VGA or of 1024×780 for a super VGA.

11. A method of converting geospatial database into compressive database, as recited in claim 2, wherein the initial step further comprises the steps of:
   calculating a maximum display area on said display area of said physical display device;
   determining at least a maximum scaling factor in form of said two or more dimensional geodetic coordinates by means of a geospatial database resolution; and
   determining a maximum accuracy in form of said pixel coordinates for geospatial data points in form of said two or more dimensional geodetic coordinates, wherein a real size in form of said two or more dimensional geodetic coordinates is presented by said maximum display area of said physical display.

12. A method of converting geospatial database into compressive database, as recited in claim 4, wherein the initial step further comprises the steps of:
   calculating a maximum display area on said display area of said physical display device;
   determining at least a maximum scaling factor in form of said two or more dimensional geodetic coordinates by means of a geospatial database resolution; and
   determining a maximum accuracy in form of said pixel coordinates for geospatial data points in form of said two or more dimensional geodetic coordinates, wherein a real size in form of said two or more dimensional geodetic coordinates is presented by said maximum display area of said physical display.

13. A method of converting geospatial database into compressive database, as recited in claim 6, wherein the initial step further comprises the steps of:
   calculating a maximum display area on said display area of said physical display device;
   determining at least a maximum scaling factor in form of said two or more dimensional geodetic coordinates by means of a geospatial database resolution; and
   determining a maximum accuracy in form of said pixel coordinates for geospatial data points in form of said two or more dimensional geodetic coordinates, wherein a real size in form of said two or more dimensional geodetic coordinates is presented by said maximum display area of said physical display.

14. A method of converting geospatial database into compressive database, as recited in claim 8, wherein the initial step further comprises the steps of:
   calculating a maximum display area on said display area of said physical display device;
   determining at least a maximum scaling factor in form of said two or more dimensional geodetic coordinates by means of a geospatial database resolution; and
   determining a maximum accuracy in form of said pixel coordinates for geospatial data points in form of said two or more dimensional geodetic coordinates, wherein a real size in form of said two or more dimensional geodetic coordinates is presented by said maximum display area of said physical display.

15. A method of converting geospatial database into compressive database, as recited in claim 11, wherein in the step (a), said geospatial database is optimally partitioned into said plurality of data segments based on said real size in form of said two or more dimensional geodetic coordinates represented by said maximum display area of said physical display device, wherein each of said data segments is at least partially displayed under said maximum display area of said physical display device.

16. A method of converting geospatial database into compressive database, as recited in claim 12, wherein in the step (a), said geospatial database is optimally partitioned into said plurality of data segments based on said real size in form of said two or more dimensional geodetic coordinates represented by said maximum display area of said physical display device, wherein each of said data segments is at least partially displayed under said maximum display area of said physical display device.

17. A method of converting geospatial database into compressive database, as recited in claim 13, wherein in the step (a), said geospatial database is optimally partitioned into said plurality of data segments based on said real size in form of said two or more dimensional geodetic coordinates represented by said maximum display area of said physical display device, wherein each of said data segments is at least partially displayed under said maximum display area of said physical display device.

18. A method of converting geospatial database into compressive database, as recited in claim 14, wherein in the step (a), said geospatial database is optimally partitioned into said plurality of data segments based on said real size in form of said two or more dimensional geodetic coordinates represented by said maximum display area of said physical display device, wherein each of said data segments is at least partially displayed under said maximum display area of said physical display device.

19. A method of converting geospatial database into compressive database, as recited in claim 1, wherein the step (b) further comprises the steps of:
(b-1) analyzing said geospatial database in a global coordinate system in form of said two or more dimensional geodetic coordinates to uniquely present said partitioned data segments; and
(b-2) determining said special point position in each of said data segments to represent said respective partitioned data segment, wherein said reference point position (RPP) being selected is defined as said coordinate origin point for said respective data segment, wherein a absolute position of each of said data segments is exactly described by said coordinate origin point in form of said two or more dimensional geodetic coordinates.

20. A method of converting geospatial database into compressive database, as recited in claim 2, wherein the step (b) further comprises the steps of:
(b-1) analyzing said geospatial database in a global coordinate system in form of said two or more dimensional geodetic coordinates to uniquely present said partitioned data segments; and
(b-2) determining said special point position in each of said data segments to represent said respective partitioned data segment, wherein said reference point position (RPP) being selected is defined as said coordinate origin point for said respective data segment, wherein a absolute position of each of said data segments is exactly described by said coordinate origin point in form of said two or more dimensional geodetic coordinates.

21. A method of converting geospatial database into compressive database, as recited in claim 15, wherein the step (b) further comprises the steps of:
(b-1) analyzing said geospatial database in a global coordinate system in form of said two or more dimensional geodetic coordinates to uniquely present said partitioned data segments; and
(b-2) determining said special point position in each of said data segments to represent said respective partitioned data segment, wherein said reference point position (RPP) being selected is defined as said coordinate origin point for said respective data segment, wherein a absolute position of each of said data segments is exactly described by said coordinate origin point in form of said two or more dimensional geodetic coordinates.

22. A method of converting geospatial database into compressive database, as recited in claim 16, wherein the step (b) further comprises the steps of:
(b-1) analyzing said geospatial database in a global coordinate system in form of said two or more dimensional geodetic coordinates to uniquely present said partitioned data segments; and
(b-2) determining said special point position in each of said data segments to represent said respective partitioned data segment, wherein said reference point position (RPP) being selected is defined as said coordinate origin point for said respective data segment, wherein a absolute position of each of said data segments is exactly described by said coordinate origin point in form of said two or more dimensional geodetic coordinates.

23. A method of converting geospatial database into compressive database, as recited in claim 17, wherein the step (b) further comprises the steps of:
(b-1) analyzing said geospatial database in a global coordinate system in form of said two or more dimensional geodetic coordinates to uniquely present said partitioned data segments; and
(b-2) determining said special point position in each of said data segments to represent said respective partitioned data segment, wherein said reference point position (RPP) being selected is defined as said coordinate origin point for said respective data segment, wherein a absolute position of each of said data segments is exactly described by said coordinate origin point in form of said two or more dimensional geodetic coordinates.

24. A method of converting geospatial database into compressive database, as recited in claim 18, wherein the step (b) further comprises the steps of:
(b-1) analyzing said geospatial database in a global coordinate system in form of said two or more dimensional geodetic coordinates to uniquely present said partitioned data segments; and
(b-2) determining said special point position in each of said data segments to represent said respective partitioned data segment, wherein said reference point position (RPP) being selected is defined as said coordinate origin point for said respective data segment, wherein a absolute position of each of said data segments is exactly described by said coordinate origin point in form of said two or more dimensional geodetic coordinates.

25. A method of converting geospatial database into compressive database, as recited in claim 19, wherein in said step (d), said local position relationship is with respect to said coordinate origin point in a sense of double float format and said relationship of said local coordinates is translated to global coordinates.

26. A method of converting geospatial database into compressive database, as recited in claim 20, wherein in said step (d), said local position relationship is with respect to said coordinate origin point in a sense of double float format and said relationship of said local coordinates is translated to global coordinates.

27. A method of converting geospatial database into compressive database, as recited in claim 21, wherein in said step (d), said local position relationship is with respect to said coordinate origin point in a sense of double float format and said relationship of said local coordinates is translated to global coordinates.

28. A method of converting geospatial database into compressive database, as recited in claim 22, wherein in said step (d), said local position relationship is with respect to said coordinate origin point in a sense of double float format and said relationship of said local coordinates is translated to global coordinates.

29. A method of converting geospatial database into compressive database, as recited in claim 23, wherein in said step (d), said local position relationship is with respect to said coordinate origin point in a sense of double float format and said relationship of said local coordinates is translated to global coordinates.

30. A method of converting geospatial database into compressive database, as recited in claim 24, wherein in said step (d), said local position relationship is with respect to said coordinate origin point in a sense of double float format and said relationship of said local coordinates is translated to global coordinates.

31. A method of converting geospatial database into compressive database, as recited in claim 1, after the step (e), further comprising the step of:
 (f) establishing an index file associated with the step (a) to the step (e) in order to dramatically affect a speed of access when querying a digital map database.

32. A method of converting geospatial database into compressive database, as recited in claim 2, after the step (e), further comprising the step of:
 (f) establishing an index file associated with the step (a) to the step (e) in order to dramatically affect a speed of access when querying a digital map database.

33. A method of converting geospatial database into compressive database, as recited in claim 25, after the step (e), further comprising the step of:
 (f) establishing an index file associated with the step (a) to the step (e) in order to dramatically affect a speed of access when querying a digital map database.

34. A method of converting geospatial database into compressive database, as recited in claim 0.26, after the step (e), further comprising the step of:
 (f) establishing an index file associated with the step (a) to the step (e) in order to dramatically affect a speed of access and query when querying a digital map database.

35. A method of converting geospatial database into compressive database, as recited in claim 27, after the step (e), further comprising the step of:
 (f) establishing an index file associated with the step (a) to the step (e) in order to dramatically affect a speed of access when querying a digital map database.

36. A method of converting geospatial database into compressive database, as recited in claim 28, after the step (e), further comprising the step of:
 (f) establishing an index file associated with the step (a) to the step (e) in order to dramatically affect a speed of access when querying a digital map database.

37. A method of converting geospatial database into compressive database, as recited in claim 29, after the step (e), further comprising the step of:
 (f) establishing an index file associated with the step (a) to the step (e) in order to dramatically affect a speed of access when querying a digital map database.

38. A method of converting geospatial database into compressive database, as recited in claim 30, after the step (e), further comprising the step of:
 (f) establishing an index file associated with the step (a) to the step (e) in order to dramatically affect a speed of access when querying a digital map database.

* * * * *